United States Patent Office 3,501,426
Patented Mar. 17, 1970

3,501,426
DIFFUSION PROCESS FOR MAKING FOAMABLE STYRENE POLYMER GRANULES
John Yu, Edmonton, Alberta, Canada, assignor to The Dow Chemical Company, Midland, Mich., a corporation of Delaware
No Drawing. Filed Dec. 21, 1967, Ser. No. 692,314
Int. Cl. C08f 47/10; C08g 53/10; C08j 1/26
U.S. Cl. 260—2.5                                 4 Claims

ABSTRACT OF THE DISCLOSURE

The invention relates to the manufacture of foamable styrene polymer particles by a diffusion process which comprises contacting said polymer particles with a volatile organic fluid foaming agent while dispersed in a predominantly aqueous medium containing an insoluble zinc oxide, hydroxide, or carbonate, and a tertiary amine oxide as dispersing agents.

---

This invention relates to the production of foamable styrene polymer particles. It pertains especially to improvements in a process and in dispersing agents for the production of free-flowing discrete particles of foamable styrene polymers and relates to a method of making such foamable thermoplastic polymer particles.

It is known to prepare expansible styrene polymer particles by heating particles of the polymer while dispersed in an aqueous diffusion mixture comprising water and a volatile organic liquid in which the polymer is insoluble, or which only swells the polymer, and as a dispersing agent a finely divided insoluble inorganic material, or said inorganic material and a surfactant.

In the production of expandable or foamable styrene polymer particles by a steeping-in or diffusion process of heating particles of the polymer in admixture with an aqueous medium and a volatile organic liquid foaming agent, it has often been observed that the product contains substantial portions of agglomerated particles, or clumps of a plurality of the polymer particles stuck together, which agglomerates of polymer particles cannot be readily broken apart as free-flowing particles of uniform size, and are undesirable. The agglomerates and clumps represent off-grade material and are largely waste.

Accordingly, it is a primary object of the invention to provide improvements in a process and dispersing agents for the production of free-flowing particles of foamable styrene polymers of substantially uniform size. Another object is to provide in combination a dispersing agent and an anti-agglomerating agent in a process for the production of expandable free-flowing styrene polymer particles containing a volatile organic fluid foaming agent uniformly dispersed throughout. Still another object is to provide a process for making free-flowing foamable styrene polymer particles in an aqueous medium. Other and related objects may appear from the following description of the invention.

According to the invention the foregoing and related objects are obtained by contacting particles of normally solid styrene polymers with a volatile organic fluid, in which the polymer is insoluble, while the polymer particles are suspended in an aqueous medium containing as the dispersing agent a finely divided water-insoluble inorganic compound such as zinc oxide, zinc hydroxide or zinc carbonate, and a small amount of at least one, preferably a mixture of, tertiary amine oxides which have attached to the amine nitrogen atom two lower alkyl groups of not more than three carbon atoms each and one primary $C_{10}$ to $C_{18}$ alkyl group, and in which mixtures of tertiary amine oxides from 10 to 50 percent by weight of said mixture consists of a tertiary amine oxide having a primary $C_{10}$ to $C_{18}$ alkyl group in which there is a normal alkyl group of 1 to 5 carbon atoms attached as a side chain to the beta carbon atom of the primary alkyl chain.

Suitable amine oxides are those having the formula

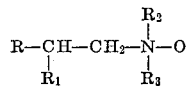

wherein R represents an alkyl radical containing from 6 to 12 carbon atoms, $R_1$ represents a normal alkyl radical containing from 1 to 5 carbon atoms such that the

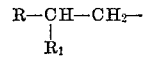

group contains from 12 to 16 carbon atoms, and $R_2$ and $R_3$ each represent lower alkyl radicals having from 1 to 3 carbon atoms, and mixtures consisting essentially of from 10 to 40 percent by weight of branched chain alkyl amine oxides having the above formula with the remainder, or correspondingly from 90 to 60 percent by weight, of said mixture consisting essentially of a normal alkyl tertiary amine oxide having the formula

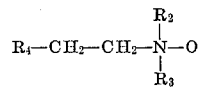

wherein $R_4$ represents a normal alkyl group containing from 10 to 16 carbon atoms and $R_2$ and $R_3$ have the meaning given above.

Among specific tertiary amine oxides useful in practice of the invention are tridecyl-dimethyl-tertiary amine oxides, tridecyl-diethyl-tertiary amine oxides, pentadecyl-dimethyl-tertiary amine oxides, pentadecyl-diethyl-tertiary amine oxides, pentadecyl-diisopropyl-tertiary amine oxides, normal dodecyl di-lower-alkyl tertiary amine oxides, branched-chain dodecyl di-lower alkyl tertiary amine oxides in which the dodecyl group is a beta-methyl, ethyl, propyl, butyl, or amyl-substituted undecyl, decyl, nonyl, octyl or heptyl radical, or mixtures of any two or more of said tertiary amine oxides as hereinbefore described. Lauryl, coco and cetyl dimethylamine oxides are preferred. The tertiary amine oxide or mixture of tertiary amine oxides can be used in an amount within the range of from about 0.005 to 0.025 percent by weight of the aqueous suspending agent used, although somewhat greater or lesser amounts can be used, especially when the ratio of the weight of the polymer particles to the weight of the aqueous medium varies within the range of from about 1.5:1 to 1:4.

The tertiary amine oxides and a method of making the same are described in Canadian Patent No. 747,963, and in United States Patent No. 3,234,283.

The inorganic difficulty soluble compound can be any finely divided water-insoluble oxide, hydroxide, or carbonate of zinc, e.g. zinc oxide, zinc hydroxide, or zinc carbonate.

The inorganic zinc compound can be used in amounts of from about 0.3 to 5 percent by weight of the aqueous suspending medium.

Expandable styrene polymer granules or beads can readily be obtained by heating the polymer particles in admixture with a diffusion mixture comprising a major proportion by weight of water and a minor proportion of a volatile organic fluid such as one or a mixture of two or more saturated aliphatic hydrocarbons or perchlorofluorocarbons having a molecular weight of at least 56 and boiling at a temperature below 100° C. at 760 millimeters absolute pressure.

The polymer can be any normally solid resinous thermoplastic polymer or copolymer consisting perdominantly of a vinylidene aromatic compound such as homopolymers and copolymers of monovinyl aromatic compounds or copolymers of a predominant amount of a styrene and a minor amount of another monoethylenically unsaturated monomer copolymerizable therewith e.g. vinyl acetate, ethyl acrylate, or methyl methacrylate. Homopolymers or copolymers of monovinyl aromatic compounds such as styrene, vinyltoluene, vinylxylene, ethylvinylbenzene, isopropylstyrene, tert-butylstyrene, chlorostyrene, dichlorostyrene, bromostyrene, fluorostyrene, and copolymers of styrene and vinyl acetate, or copolymers of styrene and methyl methacrylate, are suitable.

The method is advantageously employed in the preparation of foamable styrene polymer compositions, i.e. polymer granules consisting essentially of a normally solid resinous thermoplastic polymer containing in chemically combined form a predominant amount of at least one monovinyl aromatic compound having the general formula $Ar—CH=CH_2$ wherein Ar represents an aromatic or a haloaromatic nucleus of the benzene series, and a minor amount of another monoethylenically unsaturated compound copolymerizable therewith, which polymer granules are capable of developing a cellular structure when heated, because they contain a volatile organic fluid uniformly dispersed throughout. The organic fluid can be diffused into said polymer granules by heating the polymer and said fluid in contact with one another in an aqueous medium containing the herein defined inorganic suspending agents and tertiary amine oxides at elevated temperatures in admixture with the volatile organic fluid foaming agent.

Examples of volatile organic fluids that can be incorporated or diffused into the polymer granules to form foamable polymer particles are aliphatic and cycloaliphatic hydrocarbons containing from 4 to 8 carbon atoms in the molecule such as butane, pentane, hexane, heptane, octane, or cyclopentane, and perhalofluorocarbons such as dichlorodifluoromethane, monochlorotrifluoromethane, trichloromonofluoromethane, trifluorobromomethane, monochloropentafluoroethane, dichlorotetrafluoroethane, tetrachlorodifluoroethane, trichlorotrifluoroethane, dibromotetrafluoroethane, hexafluoroethane or octafluorocyclobutane, which volatile organic fluid boils at a temperature below 100° C. at 760 millimeters absolute pressure. Mixtures of any two or more of the volatile organic compounds can also be used.

It is important that the process be carried out while maintaining the aqueous medium acidic in the range of a pH value of from about 1 to 2.2, preferabbly from 1 to 2.0. The pH of the aqueous medium can be adjusted with an acid such as sulfuric, hydrochloric or nitric acid, and can be maintained by means of a buffer salt, e.g. disodium acid phosphate ($Na_2HSO_4$).

The method can be employed in the making of foamable beads or granules of the polymer from polymer particles that are segments of extruded rods of the polymer, preferably containing the polymer in an oriented or strained condition, so that upon heating to its softening point or above, the oriented polymer segments relax and shrink to form rounded grandules, or from ground polymer in the form of particles of irregular sizes, or from segments of extruded rods, strands or particles of extruded sheet, or from beads of the polymer.

In practice, the process can be carried out by placing the polymer particles or segments of extruded rods, in the desired sizes, in a pressure-resistant vessel equipped with a stirrer and means such as a jacketed shell for heating or cooling the same, and is suspended in from about one to four parts by weight of water containing the desired amount of the zinc oxide or carbonate and the tertiary amine oxide. The mixture is stirred, and heated, preferably to temperatures of about 90° C. to 180° C. The volatile organic fluid blowing agent can be introduced all at once prior to heating of the mixture, or it can be fed to the vessel in increments or small portions or in continuous manner at about the rate it is absorbed or diffused into the polymer granules, until the desired amount of volatile compound, which is generally in the range of from about four-and-one-half to about nine percent by weight of the polymer, has been incorporated into the polymer granules. Thereafter, the polymer is cooled under pressure of the materials in the vessel. The vessel is opened, and the polymer is separated by filtering. The polymer granules containing the volatile blowing agent are preferably reslurried in water which is then made acidic by the addition of an inorganic acid such as hydrochloric acid or sulfuric acid to a pH value of from about 2 to 3, after which the polymer granules are stirred for a short time, e.g. 15 minutes or thereabout, then are separated from the aqueous solution and are washed with water and dried.

In an alternative procedure the monomer, e.g. styrene, is added to the reaction vessel containing the water and dispersing agents, and is polymerized in the aqueous suspension to form solid polymer granules. The volatile fluid foaming agent is then added to the vessel after polymerization is complete and is incorporated into the polymer granules.

The following examples illustrate ways in which the principle of the invention has been applied but are not to be construed as limiting its scope.

Example 1

In each of a series of experiments a charge of 105 grams of deionized water, 5 grams of an aqueous 1 weight percent solution of lauryldimethylamine oxide, and sufficient dilute nitric acid to bring the pH value of the aqueous medium to that stated in the following table, was placed in a pressure resistant glass bottle. Then there was added 2.4 grams of zinc oxide, 100 grams of polystyrene beads of sizes between 16 and 20 mesh per inch as determined by U.S. Standard screens, and 8 grams of normal pentane. Thereafter, the bottle was sealed (capped), shaken vigorously by hand, then was rotated end over end at a speed of 38 revolutions per minute in an oil bath that was heated from 25° C. to 123° C. over a period of 2.5 hours. Heating and reacting in the oil bath at 123° C. was continued for 3 hours longer. The bottle was removed from the bath and allowed to cool to room temperature. It was opened and the product removed. The product was washed with a dilute one weight percent aqueous solution of hydrochloric acid, then with water and was dried in air at room temperature. The product was examined for "clumps" or "agglomerates" of polymer beads and for discrete free-flowing polymer beads. All of the beads expanded to produce a foamed polymer product upon heating in hot water at 95–100° C. Table I identifies the experiments, gives the pH value of the aqueous suspending medium and the degree of clumping expressed as percent by weight of the polymer beads, and also gives the percent by weight of free-flowing individual polymer beads.

TABLE I

| Run Number: | Aqueous medium, pH | Clumps, percent | Free-flowing beads, percent |
|---|---|---|---|
| 1 | 10.1 | 99 | 1 |
| 2 | 7.3 | 68 | 32 |
| 3 | 6.4 | 57 | 43 |
| 4 | 5.4 | 46 | 54 |
| 5 | 4.4 | 35 | 65 |
| 6 | 2.8 | 18 | 82 |
| 7 | 2.2 | 10 | 90 |
| 8 | 1.6 | 3 | 97 |
| 9 | 1.3 | 0 | 100 |

Example 2

A charge of 80 grams of deionized water, 28 grams of deionized water made acidic with nitric acid to a pH of 1.3, and 2 grams of an aqueous 1 weight percent solution of lauryl-dimethylamine oxide, together with 2.38 grams of zinc oxide, 1.38 grams of disodium hydrogen phosphate ($Na_2HPO_4$), 100 gams of polystyrene beads of sizes between 16 and 20 mesh per inch as determined by U.S. Standard screens, which polystyrene had a viscosity characteristic of 40 centipoises as determined for a 10 weight percent solution of said polystyrene at 25° C., and 8 grams of n-pentane, were sealed in a pressure resistant glass bottle and heated under time and temperature conditions as follows: from 25° to 123° C. over a period of 2.5 hours; 3 hours at 123° C.; then cool to room temperature. The bottle was opened and the polymer recovered. It was washed with an aqueous one weight percent solution of hydrochloric acid, then with water, and was dried in air at room temperature. The product was individual free flowing beads. There were no clumps of beads. The beads iontained 6.71 percent by weight n-pentane or volatiles, by analysis. The beads foamed upon heating in hot water to form cellular pellets having a bulk density of 1.25 lbs./cu. ft., a smooth outer skin and an inner structure of individually-closed fine thin-walled cells.

Example 3

A charge of 45 grams of deionized water, 25 grams of deionized water acidified with nitric acid to a pH of 1.3 and 40 grams of an aqueous 1 weight percent solution of coco (a mixture of $C_{12}$ and $C_{14}$ alkyl) dimethyl amine oxide, together with 2.38 grams of zinc oxide, 1.38 grams of $Na_2HPO_4$, 100 grams of polystyrene beads, 16–20 mesh size, and 8 grams of n-pentane were sealed in a pressure resistant glass bottle and heated under time and temperature conditions as employed in Example 2. The polymer beads were recovered. The beads contained 6.07 percent by weight of volatile material. They were foamed to a bulk density of 1.16 lbs./cu. ft. The foamed beads had a smooth skin and were composed of fine cells. Only 0.2 percent of the impregnated beads were in clumps.

Example 4

A charge of 75 grams of deionized water, 25 grams of deionized water made acidic with nitric acid to a pH of 1.3, and 10 grams of an aqueous 1 weight percent solution of cetyldimethyl amine oxide, together with 2.3 grams of zinc oxide, 1.38 grams of $Na_2HPO_4$, 100 grams of polystyrene beads of 16–20 mesh size, and 8 grams of n-pentane were sealed in a glass pressure resistant bottle and heated under time and temperature conditions similar to those employed in Example 2. The polymer beads were recovered. The beads contained 6.02 percent by weight of volatile material and foamed to a cellular product having a bulk density of 1.42 lbs./cu. ft. upon heating in hot water at 95° C. The foamed beads had a smooth surface and fine cell structure. There were no clumps of beads.

In contrast, when the beads are treated in a similar way, but in the absence of the cetyldimethyl amine oxide, 97.5 percent of the beads are obtained as clumps of beads.

I claim:
1. In a process for making expandable styrene polymer particles by a diffusion process of contacting particles of said styrene polymer, suspended in a predominantly aqueous liquid containing a finely divided difficultly soluble inorganic solid material, with a volatile organic fluid blowing agent in which said styrene polymer is insoluble, the improvement which comprises contacting particles of said styrene polymer with said volatile organic fluid blowing agent while suspended in said aqueous medium at a pH between about 1.0 and 2.2 which contains from 0.05 to about 0.025 part of a tertiary amine oxide having the formula

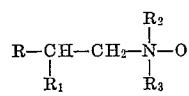

wherein R represents an alkyl radical containing from 6 to 12 carbon atoms, $R_1$ represents a normal alkyl radical containing from 1 to 5 carbon atoms such that the

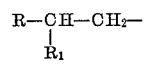

group contains from 12 to 16 carbon atoms, and $R_2$ and $R_3$ each represent alkyl radicals having from 1 to 3 carbon atoms, and subsequently adding about 0.3 to about 5 parts by weight per 100 parts of said aqueous medium of an oxide, hydroxide or carbonate of zinc.

2. A process as claimed in claim 1 wherein the inorganic material is zinc oxide and the tertiary amine oxide is lauryl dimethylamine oxide.

3. A process as claimed in claim 1 wherein the inorganic materials is zinc oxide and the tertiary amide oxide is coco dimethylamine oxide.

4. A process as claimed in claim 1 wherein the inorganic material is zinc oxide and the tertiary amine oxide is cetyl dimethylamine oxide.

References Cited

UNITED STATES PATENTS 2,888,410   5/1959   Buchholtz.
3,234,283   2/1966   Finch et al. _____ 260—676

MURRAY TILLMAN, Primary Examiner
MORTON FOELAK, Assistant Examiner

U.S. Cl. X.R.
260—29.6, 583